United States Patent [19]

Bourgain et al.

[11] 3,987,322

[45] Oct. 19, 1976

[54] DEVICE PROVIDING A COUPLING BETWEEN AN ELECTRIC DRIVING MOTOR AND A DRIVEN ELEMENT

[75] Inventors: Louis Bourgain, Le Chesnay; Joseph Peano, Arpajon, both of France

[73] Assignee: Commissariat a l'Energie Atomique, Paris, France

[22] Filed: Mar. 10, 1975

[21] Appl. No.: 557,103

[30] Foreign Application Priority Data
Mar. 11, 1974 France .............................. 74.08226

[52] U.S. Cl. ............................... 310/51; 310/75 D
[51] Int. Cl.² ............................................ H02K 5/24
[58] Field of Search ............. 310/75, 51, 75 D, 157; 64/11

[56] References Cited
UNITED STATES PATENTS

| | | |
|---|---|---|
| 3,158,768 | 11/1964 | Schönwald .......................... 310/157 |
| 3,264,503 | 8/1966 | Wiedemann .......................... 310/51 |
| 3,568,962 | 3/1971 | Janssen ............................. 310/51 X |
| 3,676,723 | 7/1972 | Drucker ............................. 310/157 |

*Primary Examiner*—Donovan F. Duggan
*Attorney, Agent, or Firm*—Cameron, Kerkam, Sutton, Stowell & Stowell

[57] ABSTRACT

In a device which provides a coupling between an electric motor and an element which is driven in rotation at very high speed and suspended from a connecting-rod which works in traction, the diameter and length of the connecting-rod are determined in respect of a given weight of the driven element and a given torque so that the ratio of the length to the diameter of the connecting-rod is higher than 50 and preferably between 90 and 200. The result thereby achieved is a minimum value of the natural frequency of the connecting-rod and maximum transverse stability.

3 Claims, 6 Drawing Figures

DEVICE PROVIDING A COUPLING BETWEEN AN ELECTRIC DRIVING MOTOR AND A DRIVEN ELEMENT

This invention relates to a device for establishing a coupling between an electric driving motor and an element which is driven in rotation at very high speed.

The usual solution adopted for making a connection of this type consists in the use of a rigid coupling rod and the gland seal of a bearing which is applied against the surface of said rod in the event that the driven element is placed in an atmosphere which has to be isolated from the external medium, said gland seal being employed in the majority of instances in conjunction with means for damping the transverse oscillations of the rod. It should be noted that in this design solution, the natural frequency of the rod is always higher than the normal speed of rotation; a potential danger consequently lies in the fact that the bearings and damping means employed may not offer a sufficient degree of resistance when passing through critical speeds.

If one accordingly studies the variation in the natural frequency of the rod when its diameter $d$ is caused to vary in respect of a given length L and a given weight of the driven element, then in a system of coordinates in which the frequency is plotted as ordinates and the diameter is plotted as abscissae, it is possible to plot the corresponding diagram as illustrated in FIG. 1 of the accompanying drawings. Thus, if the rod is of large diameter, it is apparent that said rod can be assimilated with a rigid beam in which the natural frequency increases when the diameter increases. On the other hand, if the diameter of the rod is very small, it constitutes a vibrating reed whose frequency decreases when the diameter increases. When the length of the rod changes, the set of curves moves in the direction of either the higher or lower frequencies according as the rod becomes shorter or longer. The curves illustrated in FIG. 2 which gives the variation in natural frequency of the rod as a function of the diameter in three successive vibration modes (first, second and third modes represented schematically at (I), (II) and (III) ) show that the frequency in respect of a predetermined mode (for example the first mode) decreases when the length of the rod increases. In the set of curves illustrated in this figure, the curves relate to lengths which are equal respectively to 30, 40 and 50 cm.

Using the foregoing experimental considerations as a conceptual basis, this invention is concerned with an improvement in the coupling provided between a motor for driving in rotation and a driven element by means of a connecting-rod. The improvement essentially consists in terminating the diameter and the length of the connecting-rod in respect of a given weight of the driven element and a given torque in such a manner as to ensure that the natural frequency of said connecting-rod is of substantially minimum value and that maximum transverse stability is achieved.

Thus the different curves of the family shown in FIG. 1 are plotted in respect of any given length L of the connecting-rod such as 25 cm for example, and in respect of a weight of the element driven by the connecting-rod which varies between 1000 and 9000 g; the corresponding curves are designated by the references $a$ to $i$, the straight line A being such as to intersect each of these curves at a point whose coordinates define substantially the characteristics of the connecting-rod to be adopted in accordance with the invention.

The weight and frequency of rotation of the moving element being given, the diameter and length of the connecting-rod are so determined as to pass beyond the critical frequencies in the vicinity of the minimum value of the curves representing their variations since this zone corresponds to very stable operation of the connecting-rod. Said diameter and said length are determined in addition so as to ensure that the operating point at the normal frequency is located at a distance from any curve corresponding to one of the critical frequencies. However, the diameter must always remain higher than the minimum value which is established by considerations of mechanical strength, especially as a function of the value of torque imposed. This results in the need to select a length at least 50 times greater than the diameter and usually between 90 and 200 times the diameter, depending on the mass of the suspended moving element.

By virtue of these arrangements and in contrast to conventional solutions, the operating frequency can be higher than the frequency corresponding to a number of successive modes of vibration of the connecting-rod. Moreover, a further important advantage of the coupling device in accordance with the invention arises from the small diameter of the connecting-rod whose end-restraint reactions are of sufficiently low value to avoid the need for accurate balancing of the moving element. It is found in practice that the forces of gravity are self-balancing and that it is not necessary to provide guide-bearings disposed at intervals along the length of the connecting-rod as in conventional designs.

It is also found that total mechanical disconnection between the driving motor and the driven element is achieved by virtue of the configuration adopted for the connecting-rod.

In order to damp the slight oscillations of the connecting-rod when passing through said critical speeds at the time of an increase in speed of the driven element, steps are accordingly taken to associate with said connecting-rod a damping means of either the dry or viscous type. But also by reason of the small diametral dimension of the rod, the peripheral velocity of this latter always remains of very low value. This makes it possible to give a simple structure to dry-state damping means, the efficiency of which is comparable with that of viscous-state damping devices but is nevertheless immediate since the amplitude of the oscillations to be damped and the force exerted by the connecting-rod on the damping means always remain of a very low order.

Advantageously and in accordance with a particular feature of the invention, the damping system associated with the connecting-rod is constituted by one or a number of stacks of pastilles having parallel faces each applied individually in frictional contact with a friction bearing surface or against each other and comprising a central bore through which the connecting-rod passes with minimum play, said pastilles being applied either together or separately by means of at least one adjusting spring against friction plates rigidly fixed to a support frame.

One form of construction consists especially in placing a stack of pastilles at a number of points of the shaft which are judiciously chosen as a function of the critical frequencies to be passed in order to attain the normal operating regime.

As a result of the very low peripheral velocity employed and taking account of the diameter of the connecting-rod which is always very small, the majority of standard friction materials are suitable for the fabrication of the pastilles.

By utilizing a number of friction pastilles which do not come into action at the same instant, the system makes it possible in particular to reduce the friction threshold of each pastille while retaining a sufficient overall displacement force to ensure the desired damping. This damping action combined with the characteristics of transverse stability of the connecting-rod makes it possible when the driven element is vertical to dispense with a top bearing which would otherwise be essential.

Leak-tightness is ensured on the one hand by the small clearance existing between the friction pastille and the rotating connecting-rod whilst the pressure drop is of considerable magnitude and on the other hand by a disc rigidly fixed to the connecting-rod in the vicinity of the moving element and displaceable in front of a stationary portion which can be the support of the damping devices, one of the two surfaces being advantageously provided with machined portions so as to constitute a molecular pump which ensures evacuation of the enclosure and discharges the small quantity of gas which has been able to pass around the pastilles.

Further properties of the invention will become apparent from the following description of one example of construction which is given by way of indication without any limitation being implied, reference being made to the accompanying drawings wherein.

Figure 1:
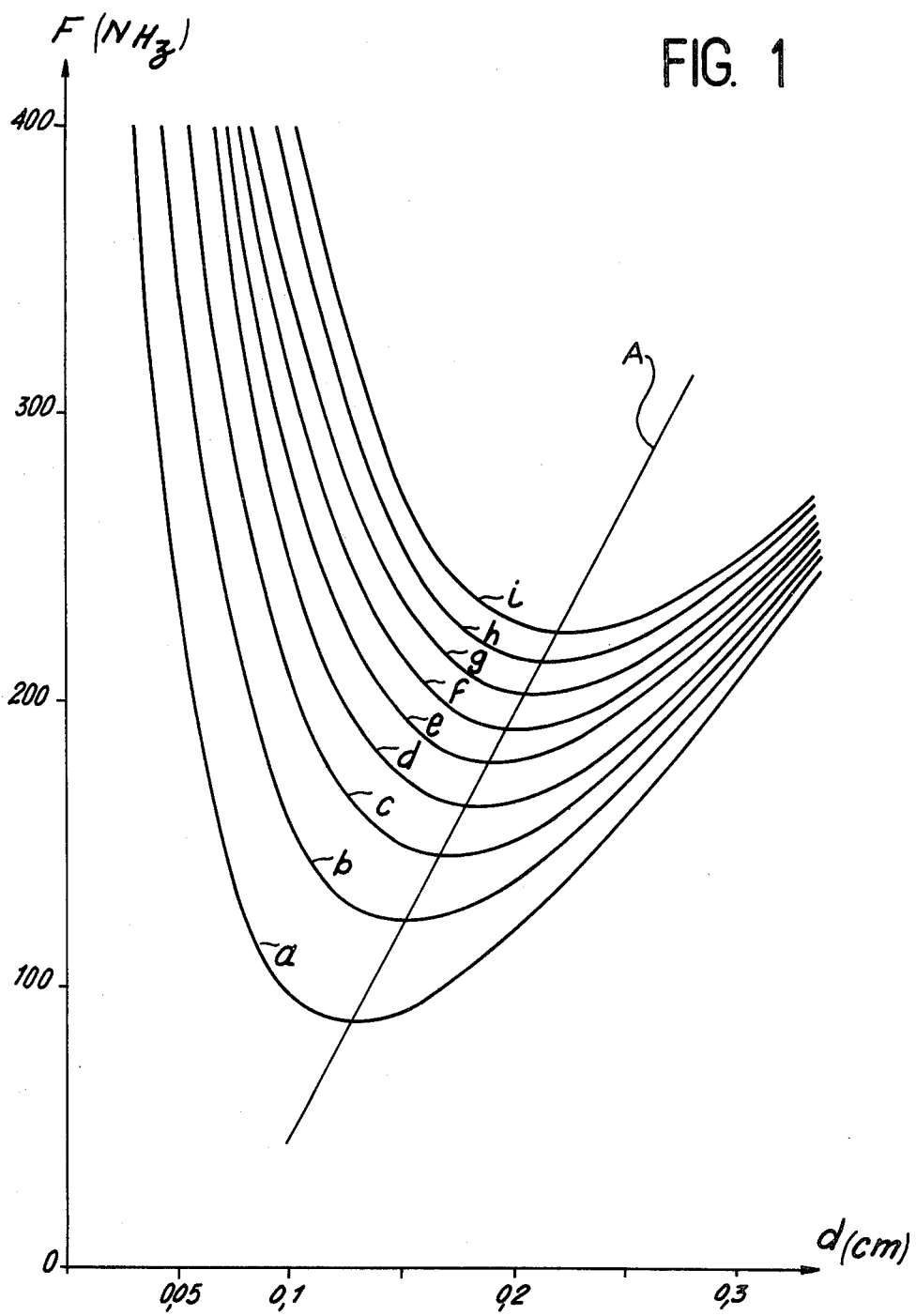
FIG. 1 is a diagram as explained in the foregoing, in which the set of curves shows in respect of a given length L of the connecting-rod the variation in natural frequency of said connecting-rod as a function of its diameter $d$ and of the mass of the suspended moving element.
Figure 2:
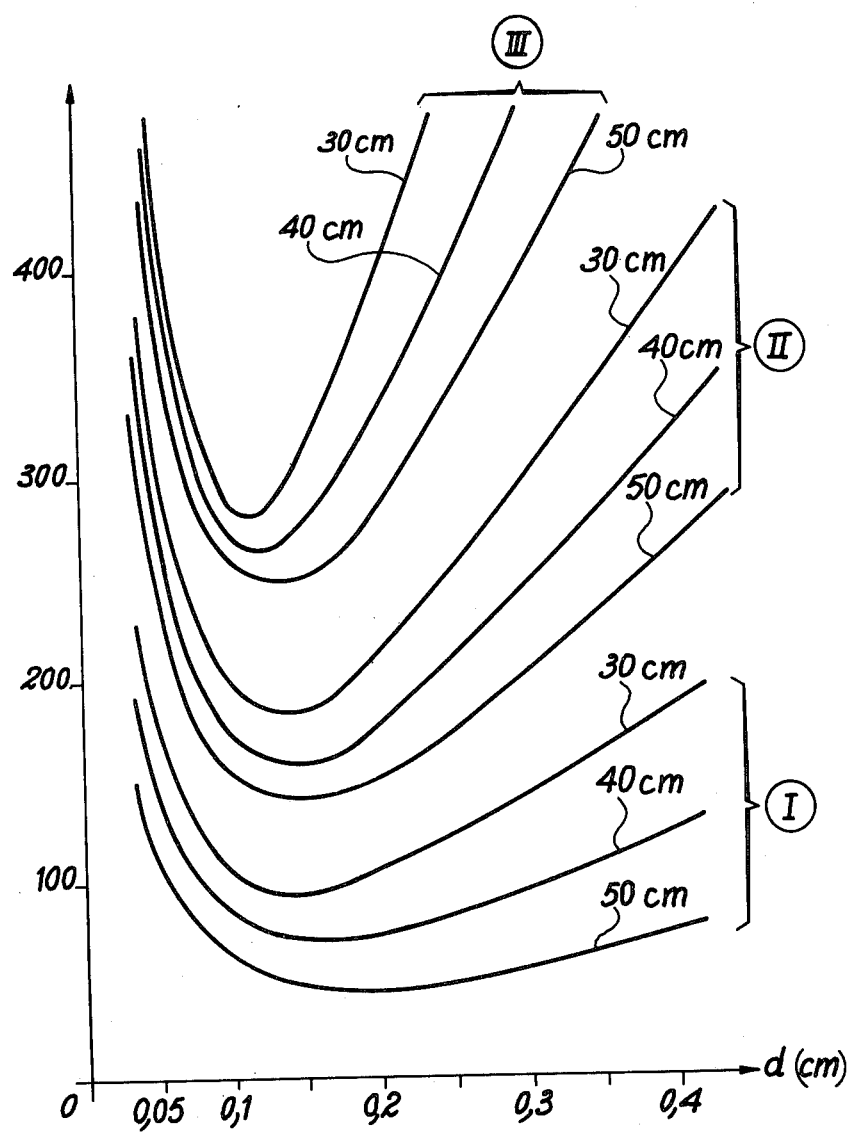
FIG. 2 shows another series of curves in which the variation in natural frequency of the connecting-rod through a number of successive modes of vibrations is given as a function of the diameter of said connecting-rod.
Figure 3:
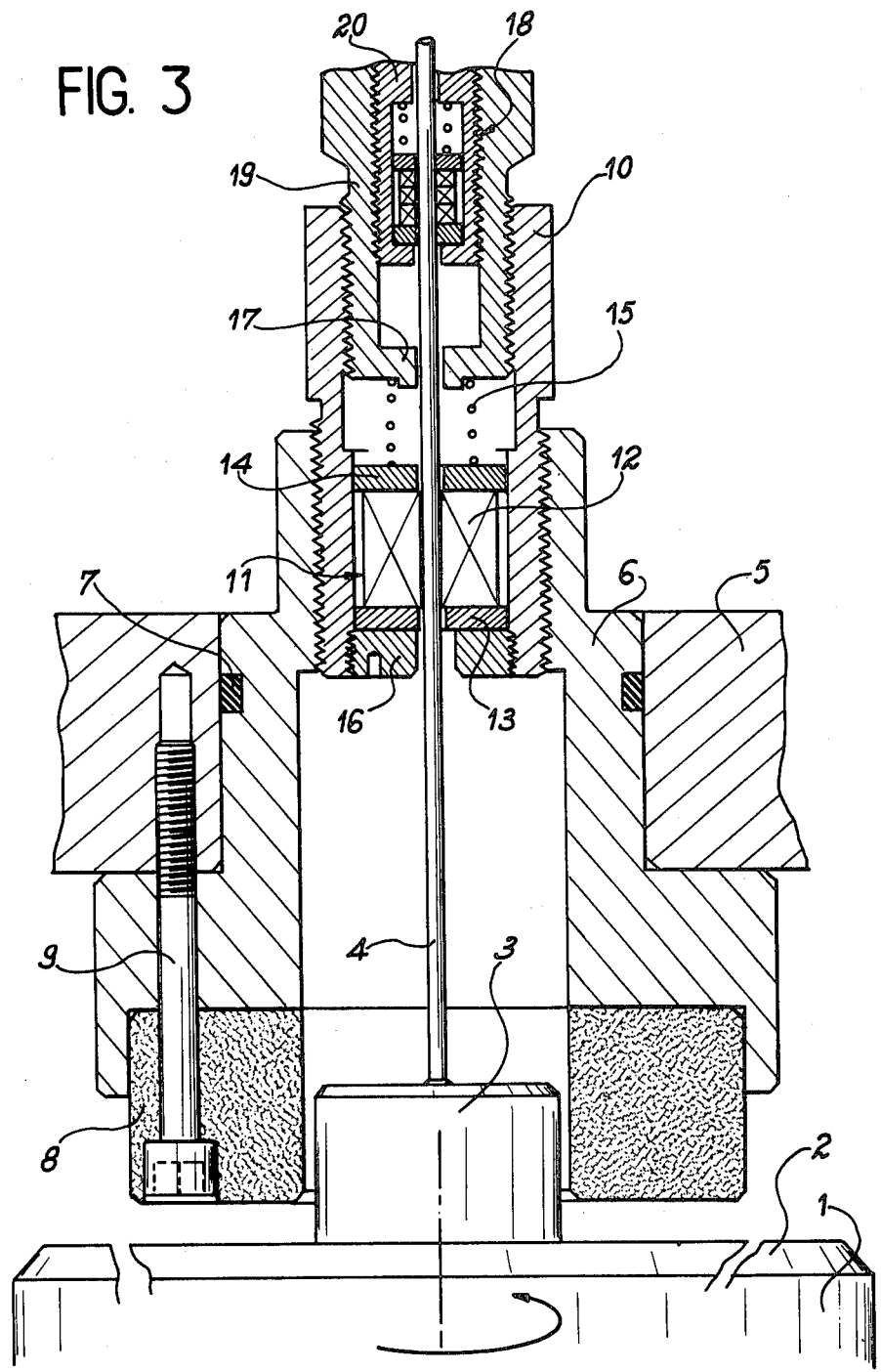
FIG. 3 is a diagrammatic longitudinal part-sectional view of the upper portion of a moving element and of its connecting-rod, which forms a coupling device in accordance with the invention.

In FIG. 3, the reference 1 designates the upper extremity of a moving element 2 which is connected by means of a central fastening end-piece 3 to a rod 4 for establishing a connection between said moving element and an electric motor for driving in rotation (not shown in the drawings). The characteristics of the connecting-rod 4, especially in regard to its diameter and its length in respect of a given weight of the moving element 1 are determined by reference to the curves of FIGS. 1 and 2 as has already been specifically explained, especially at the intersection of the adequate curve and of the straight line A.

The rotary assembly thus formed is mounted within a leak-tight casing, only the upper portion 5 of which is shown in FIG. 3. Said casing is provided with a passageway for the connecting-rod 4, there being fitted within said passageway in coaxial relation with said connecting-rod a guide bush 6 which is made leak-tight with respect to the top end-wall 5 by means of an O-ring seal 7. An abutment device 8 is mounted at the lower end of the guide bush 6 and is rigidly fixed to the top end-wall 5 by means of tie-bolts 9. The guide bush 6 is internally threaded at the upper portion thereof and rigidly fixed to a sleeve 10 in which is mounted a damping system 11 comprising in a manner which is conventional per se a buffer unit 12 pierced by a central bore providing a passageway for the connecting-rod 4 and further comprising two bearing plates 13 and 14 respectively, said bearing plates being applied by means of an adjustable pressure spring 15 against a lower abutment plate 16 which is rigidly fixed to the sleeve 10.

In accordance with a preferential alternative embodiment, the aforementioned damping system can be combined with a second assembly 18 mounted within a threaded bushing 19 which in turn carries a support frame 20.

Figure 5:
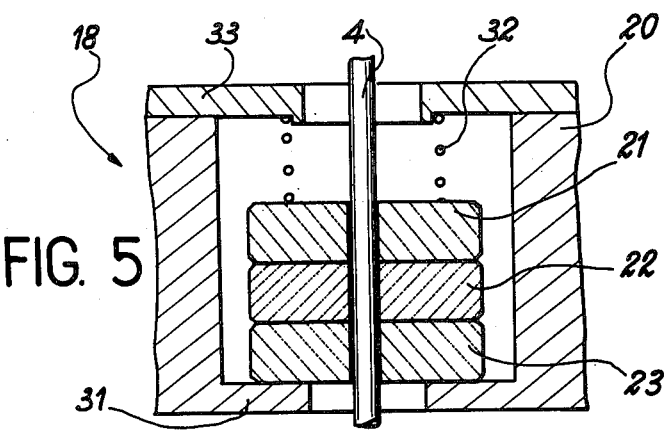
FIGS. 4 and 5 are two diagrammatic sectional views of a damping system which is suitable for use in combination with the connecting-rod.
Figure 4:
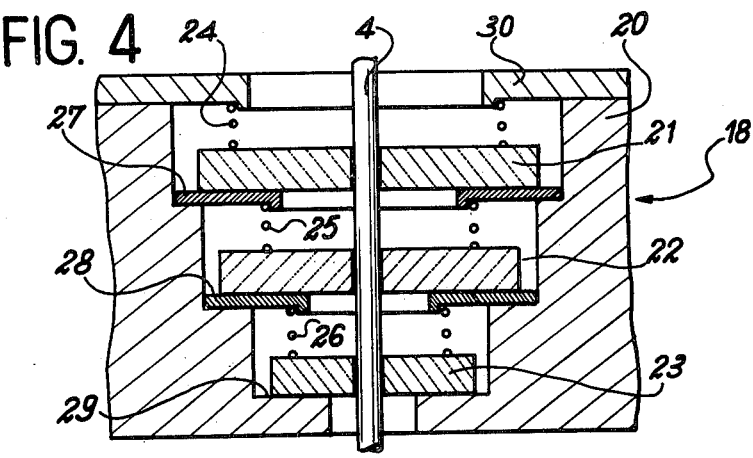

FIGS. 4 and 5 illustrate to a larger scale the constructional detail of said damping system 18 within its frame 20. As shown in particular in FIG. 4, this system is constituted by a stack of three superposed pastilles 21, 22 and 23 formed of suitable friction material such as graphite for example, an axial bore being formed in said stack so as to provide a passageway with a minimum clearance for the connecting-rod 4. By means of springs 24, 25 and 26, the stack of pastilles is applied against friction plates 27, 28 and 29 which are fitted in the frame 20, said springs 24, 25 and 26 being maintained at their opposite extremities by an end-plate 30 in the case of the spring 24 and by the bottom faces of the friction plates 27 and 28 in the case of the springs 25 and 26.

In the alternative embodiment shown in FIG. 5, the three pastilles 21, 22 and 23 are stacked directly within the interior of the support frame 20 and are traversed by the connecting-rod 4. These pastilles are applied respectively one against the other and also against the endwall 31 of the frame which forms a friction plate while being applied against this latter by means of a spring 32 supported on a cover-plate 33 of the frame 20.

Figure 6:
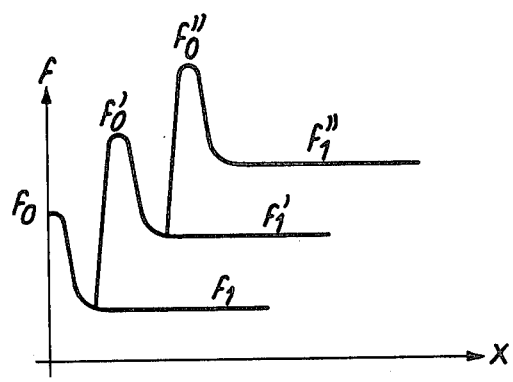
FIG. 6 is a schematic diagram which serves to explain the operation of the damping system.

Finally, the schematic diagram of FIG. 6 shows the set of curves which represent the progressive variation of the force $f$ which is applied to each pastille of the damping system in order to initiate the movement of displacement of said pastille. The movements of displacement $x$ are plotted as abscissae and the forces $f$ are plotted as ordinates.

In fact, in order to obtain the movement of displacement of any one pastille, it is found that there has to be applied to said pastille an initial force $f_o$ of greater value than the force $f_1$ which is necessary in order to maintain the movement once this latter has been initiated, which represents the initial peak on the curve of FIG. 6. There accordingly exists a double threshold for the displacement of the pastille, namely a threshold of displacement corresponding to the very small clearance between the connecting-rod and the pastille and a threshold of friction corresponding to the force $f_o$ which is necessary in order to initiate the displacement.

By virtue of the stack formed by a number of pastilles in accordance with the arrangements illustrated in FIGS. 4 and 5, it is apparent that when the connecting-rod 4 moves, it is immediately accompanied by any one of the three pastilles, especially if these latter are not in strictly aligned relation, said pastille being then followed by the other pastilles in succession. In consequence, the friction threshold is maintained at a small value which can be adjusted by the associated adjusting spring. It will further be noted that the forces $f'_1, f''_1$ can be so determined as to ensure optimum damping of the connecting-rod as a function of the displacement.

It is wholly evident that the invention is not limited to the example of construction which has been more especially described with reference to the drawings but extends on the contrary to all alternatives forms. In particular, the device considered could clearly be associated with conventional damping means, especially of the dashpot type.

What we claim is:

1. A device coupling a rotary drive motor and a driven element comprising a connecting-rod suspending said element beneath said motor and working in traction wherein, in respect of a given weight of the driven element and a given torque, the diameter and the length of the connecting-rod have a ratio of length to diameter of said connecting-rod greater than 50 and preferably between 90 and 200.

2. A coupling device according to claim 1, including at least one dry-state damping system for the connecting-rod comprising a stack of a plurality of washers having parallel faces in frictional contact with each other and also each may be applied separately against a frictional bearing surface, a central bore through said stack through which the connecting-rod passes with minimum clearance, a support frame, at least one friction plate on said frame and at least one adjusting spring applying said washers against said at least one friction plate.

3. A coupling device according to claim 2, including a plurality of dry state damping systems for said connecting-rod disposed at intervals along the length of said connecting-rod at points where critical frequencies are to be damped.

* * * * *